Oct. 21, 1924.
A. E. HOLBROOK
1,512,538
COMBINED HYDRAULIC CLUTCH AND TRANSMISSION MECHANISM
Filed July 17, 1922  2 Sheets-Sheet 2
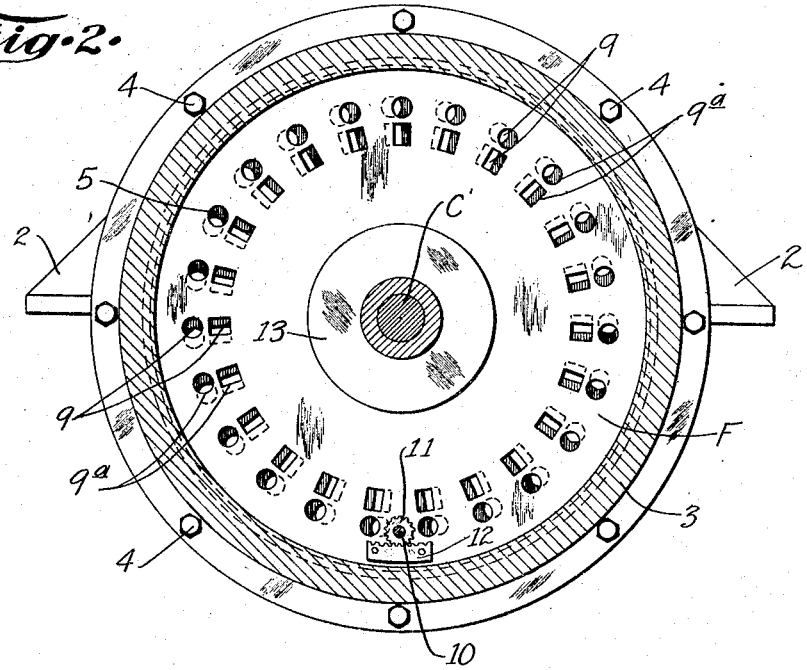
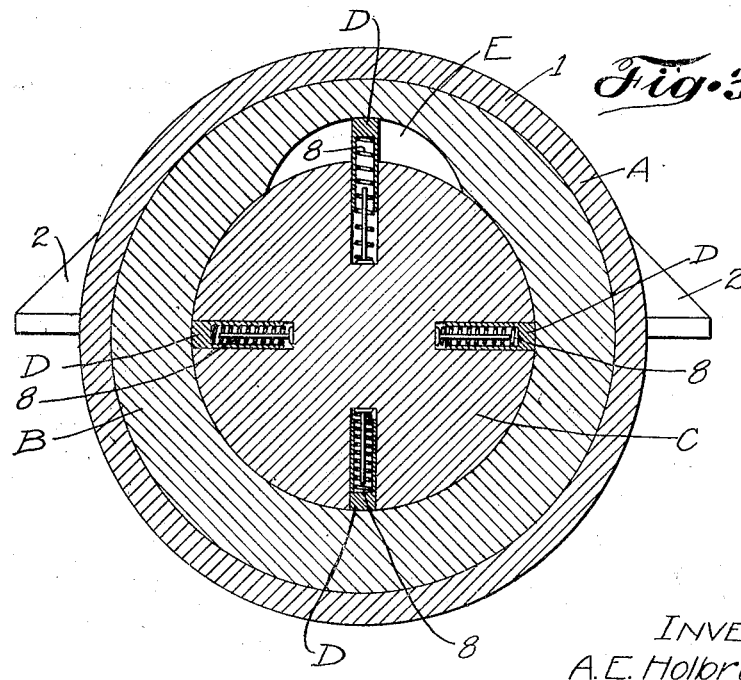
INVENTOR
A. E. Holbrook
By Bakewell & Church
ATTORNEYS Patented Oct. 21, 1924.

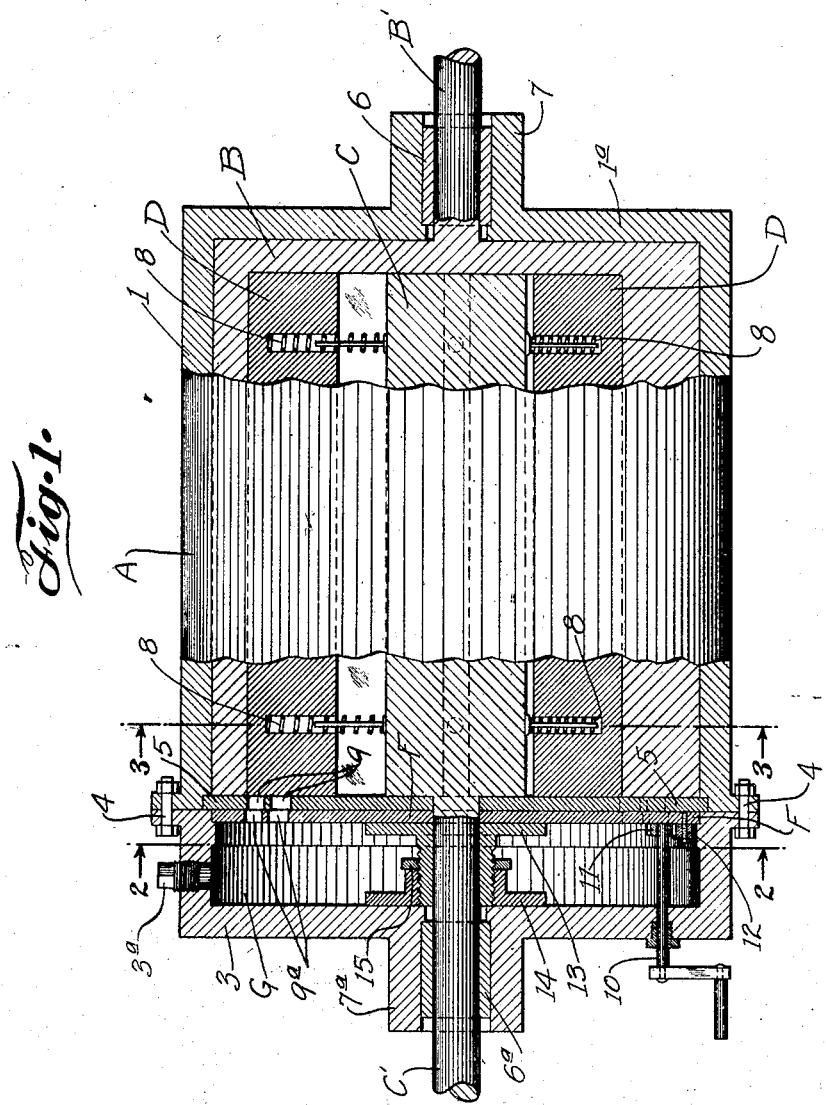

1,512,538

UNITED STATES PATENT OFFICE.

ARTHUR E. HOLBROOK, OF JOPLIN, MISSOURI.

COMBINED HYDRAULIC CLUTCH AND TRANSMISSION MECHANISM.

Application filed July 17, 1922. Serial No. 575,513.

*To all whom it may concern:*

Be it known that I, ARTHUR E. HOLBROOK, a citizen of the United States, residing at Joplin, Missouri, have invented a certain new and useful Improvement in Combined Hydraulic Clutch and Transmission Mechanisms, of which the following is a full, clear, and exact description, such as will enable others skilled in the art to which it appertains to make and use the same.

This invention relates to devices such as clutches that are used for connecting a driving member to a driven member and also to transmission mechanisms of the kind that permit the speed of the driven member to be varied relatively to the speed of the driving member which operates it.

One object of my invention is to provide an efficient hydraulic apparatus of simple design that can be used for connecting a driven member to a driving member in such a way that they will operate in unison and at the same speed.

Another object is to provide a hydraulic apparatus that can be used as a transmission mechanism which permits the driven member to be operated at an infinite number of speeds.

And still another object is to provide a combined hydraulic clutch and variable speed transmission mechanism that is inexpensive to manufacture and of such design that it is not apt to get out of order when in use.

To this end I have devised an apparatus that comprises a driving member and a driven member arranged preferably one within the other, a space or recess in one of said members that is adapted to contain a hydraulic medium, and one or more devices on the other member that are adapted to enter said space and co-operate with the hydraulic medium therein to transmit movement from the driving member to the driven member. Means is provided for trapping the hydraulic medium in said space when it is desired to have the driven member operate in unison with or at the same speed as the driving member, and in the preferred form of my invention as herein illustrated said means is so constructed that the hydraulic medium can be caused to escape from said space either rapidly or slowly when it is desired to disconnect the driven member from the driving member or have said driven member operate at a slower speed than the driving member. The uses for which my apparatus is adapted are too numerous to attempt to enumerate, but the apparatus is particularly adapted for use in a power-operated vehicle for transmitting motion from the engine to the driving wheels of the vehicle, in that it performs the dual function of a clutch and transmission mechanism and provides a greater range in the variation in speed of the driven member than is possible with the conventional transmission mechanisms now in general use. The particular details of construction of the apparatus are immaterial, so far as my broad idea is concerned, and while I have herein illustrated my invention embodied in an apparatus in which the driving member surrounds the driven member and is provided with a recess through which radially-disposed devices on the driven member travel when the controlling means for the hydraulic medium is in a condition to permit said hydraulic medium to escape from said recess, I wish it to be understood that my invention is not limited to an apparatus of the particular construction herein illustrated. The member in which the recess above referred to is formed may be provided with any number of recesses or spaces for receiving the hydraulic medium, and the other member of the apparatus may be provided with any desired number of devices of any preferred construction for compressing or exerting pressure on the hydraulic medium in said recess or recesses. The means that is used for trapping the hydraulic medium in the space or spaces previously referred to when it is desired to have the driven member operate at the same speed as the driving member, is herein illustrated as a valve that can be adjusted in such a way as to permit said hydraulic medium to escape at different rates from said recess or recesses when it is desired to have the driven member operate at a slower speed than the driving member, but the particular construction of the hydraulic controlling means is immaterial, so far as my broad idea is concerned.

Figure 1 of the drawings is a side elevational view, partly in vertical section, of a combined hydraulic clutch and transmission mechanism constructed in accordance with my invention.

Figure 2 is a transverse sectional view, taken on the line 2—2 of Figure 1, looking in the direction indicated by the arrows; and Figure 3 is a transverse sectional view, taken on the line 3—3 of Figure 1, looking in the direction indicated by the arrows.

Referring to the drawings which illustrate the preferred form of my invention, A designates a case or housing composed preferably of a stationary portion 1 provided with brackets 2 that are adapted to be secured to a supporting structure and a removable portion or cap piece 3 that is detachably connected to said stationary portion 1 by fastening devices 4, as shown in Figure 1. A driving member B, which preferably consists of a hollow cylindrical member, is rotatably mounted in the housing A between the end wall $1^a$ of said housing and a stationary, transversely-disposed partition 5 in said housing, said driving member being rigidly connected to a drive shaft B′ or other source of power that rotates in a bearing 6 of any suitable type mounted in a sleeve 7 on the rear wall 5 of the housing. The driven member C of the apparatus consists of a substantially cylindrical-shaped member rotatably mounted in the hollow driving member B and provided with one or a plurality of devices D that are adapted to co-operate with a hydraulic medium contained in a recess or recesses E on the interior of the driving member to transmit motion from the driving member to the driven member. In the apparatus herein illustrated the driving member B is provided on its inner side with a longitudinally-disposed recess E of substantially hyperbolic form in transverse cross section, and the devices D on the driven member C consist of longitudinally-disposed blades slidingly mounted in radially-disposed slots in the driven member C and backed up by springs 8 which force said blades upwardly into the recess E in the driving member, as shown in Figure 3, when said blades come into alignment with said recess.

The stationary partition 5 in the housing A is provided with numerous ports or orifices 9 of an preferred shape that extend circumferentially around same, as shown in Figure 2, and means is provided for closing and varying the effective area of said ports so as to trap the hydraulic medium in the recess E or permit said hydraulic medium to escape from said recess either slowly or rapidly when said hydraulic medium is subjected to pressure from one of the blades D, caused by the movement of the driving member relatively to the driven member. The means herein illustrated for controlling the hydraulic medium consists of an oscillating valve F arranged in sliding engagement with the partition 5 and provided with ports or orifices $9^a$ that are adapted to be brought into registration with the ports 9 in said partition by turning said valve. The solid portions of said valve intermediate the orifices $9^a$ therein serve as closures for the ports 9 in the partion 5 when said valve is in a certain position. Any suitable means can be used for turning the valve F, such, for example, as an operating shaft 10 mounted in the cap piece 3 of the housing and provided with a pinion 11 that meshes with a rack 12 on the valve. The space between the partition 5 and the end of the cap 3 of the housing serves as a chamber G for oil or any other suitable hydraulic medium, thereby permitting the hydraulic medium to pass into the recess E in the driving member or escape from said recess back into said chamber when the ports 9 in the partition 5 are open, said chamber G being provided with a filling opening normally closed by a plug $3^a$ so as to enable said chamber to be filled with oil or the like. The valve F is held in snug engagement with the partition 5 by a means herein illustrated as composed of two members 13 and 14 adjustably connected together and interposed between the valve F and the end of the cap piece 3, said members 13 and 14 being retained in adjusted relation by a lock nut 15 and the member 13 having a portion that surrounds a shaft C′ secured to the driven member C and projecting outwardly of the housing through a bearing $6^a$ carried by a sleeve $7^a$ on the cap piece 3 of the housing. Assuming that the chamber G contains oil or any other suitable hydraulic medium and that the valve F is adjusted in such a position that the orifices $9^a$ in same are in registration with the ports 9 in the partition 5, the driven member C will remain at rest when the driving member B is set in motion, due, of course, to the fact that the hydraulic medium in the recess E can escape freely from said recess through the ports 9 and $9^a$ and enter the chamber G when said hydraulic medium is subjected to pressure of one of the devices D, produced by the movement of the driving member B relatively to the driven member.

If it is desired to set the driven member C in motion, the valve F is moved into such a position that solid portions of same partially overlap the recesses 9 in the partition 5, thereby retarding the escape of the hydraulic medium from the recess E in the driving member when one of the vanes D on the driven member enters said recess. Assuming that the ports 9 in the partition 5 are partly closed and that one of the vanes D has entered the recess E, which is then filled with the hydraulic medium, the pressure which said hydraulic medium exerts on said vane will cause the driven member to start to rotate and continue to move with the driving member until the hydraulic medium has been completely expelled from the recess E by the pressure which the vane D exerts on said hydraulic medium, the driven member being given a forward impulse each time the recess E in the driving member comes into co-operation with one of the vanes D. Owing to the fact that the rate at which the hydraulic medium escapes from the recess E during the time one of the vanes D on the driven member is traversing said recess is governed by the position of the valve F, it is obvious that by turning said valve F so as to further reduce the effective area of the ports 9 in the partition 5, the speed of the driven member can be increased. When the valve F is moved into such a position that the solid portions of same close the ports 9, the escape of the hydraulic medium from the recess E will be cut off, thereby causing the hydraulic medium in said recess to act substantially like a hydraulic ram to transmit movement from the driving member to the driven member through the blade D which is then positioned in the recess E. To reduce the speed of the driven member it is only necessary to move the valve F so as to partly open the ports 9 and permit the hydraulic medium in the recess E to escape therefrom into the chamber G, thus causing the driven member C to lag and finally come to rest after the valve F has been moved into position to bring the orifices 9ª in same into full registration with the ports 9.

An apparatus of the construction above described can be used as a clutch for connecting a driving member to a driven member in various kinds of structures where it is essential that there will be some flexibility between the driving and driven members, and it can also be used as a transmission mechanism in a structure such as a power-operated vehicle, wherein it is desirable to have the driven member operate at a slower speed than the driving member under certain conditions. The apparatus can be manufactured at a low cost, due to the fact that it is composed of only a few parts and it is not liable to get out of order when in service, as the parts constituting the same are of such design that they can be made of very rugged construction.

Having thus described my invention, what I claim as new and desire to secure by Letters Patent is:

1. An apparatus of the character described, comprising a cylindrical housing provided at one end with a chamber that is adapted to contain a hydraulic medium, a driving member and a driven member arranged one within the other in concentric relation and positioned inside of said housing at one side of said chamber, the outer member having a space on the interior of same that is adapted to receive the hydraulic medium in said chamber, a device projecting outwardly from the exterior of the inner member that is adapted to enter said space, ports in one of the side walls of said chamber through which the hydraulic medium is admitted to or discharged from one end of said space, and a valve for controlling the flow of the hydraulic medium through said ports.

2. An apparatus of the character described, comprising a driving member and a driven member arranged one within the other in concentric relation, the outer member having a cylindrical shell inside of which the inner member fits snugly, a space in the inner side of the cylindrical shell of said outer member that is adapted to contain a hydraulic medium, a device on the inner member projecting radially therefrom, that is adapted to enter said space and traverse same when one of said members is moving relatively to the other, a chamber at one end of said members for containing a hydraulic medium, and means for establishing or cutting off communication between said chamber and one end of said space whereby the hydraulic medium can either be admitted to said space and trapped therein or caused to escape from said space back into said chamber at such a rate that it will co-operate with said device to transmit movement from the driving member to the driven member.

3. An apparatus of the character described, comprising a cylindrical driving member and a cylindrical driven member arranged one within the other in concentric relation, a recess in the inner surface of the outer member of substantially hyperbolic form adapted to contain a hydraulic medium, a device on the inner member projecting radially therefrom and adapted to enter said recess and means for causing said hydraulic medium to enter one end of said recess and either be trapper therein or caused to escape in the reverse direction from said recess.

4. An apparatus of the character described, comprising a cylindrical rotatable driving member, a cylindrical driven member rotatably mounted in said driving member and arranged in concentric relation with same, a space formed in the interior of the cylindrical wall of said driving member that is adapted to contain a hydraulic medium, radially-disposed devices on the driven member that are adapted to enter said space and traverse same when one of said members turns relatively to the other, and means arranged at one end of said space for causing the hydraulic medium in said space to co-operate with the device in the space to transmit movement from the driving member to the driven member.

5. An apparatus for the purpose described, consisting of a housing, a driving member rotatably mounted in said housing and comprising a cylindrical shell that fits snugly inside of said housing, said shell being provided on its interior with a longitudinally-disposed recess of substantially hyperbolic shape in transverse cross section, a chamber in said housing at one end of said driving member, that is adapted to contain a hydraulic medium, a cylindrical driven member rotatably mounted in said driving member and arranged in concentric relation with same, radially-disposed, spring-pressed blades on said driven member that are adapted to enter said recess and traverse same when one of said members rotates relatively to the other, and means whereby the hydraulic medium in said chamber can be admitted to one end of said recess and either trapped therein or caused to escape from the same end of said recess and flow slowing back into said chamber when one of the blades on the driven member is traversing said recess so as to transmit movement from the driving member to the driven member.

6. An apparatus of the character described, comprising a housing, a rotatable driving member in said housing provided on its interior with a recess of substantially hyperbolic shape in transverse cross section, a partition in said housing that separates said driving member from a chamber in the housing that is adapted to contain a hydraulic medium, ports in said partition that establish communication between said chamber and the recess in said driving member, a driven member rotatably mounted in the driving member, radially-disposed, spring-actuated blades on said driven member that are adapted to enter and traverse the recess in said driving member when said driving member moves relatively to the driven member, and a valve for controlling said ports.

7. An apparatus of the character described, comprising a housing, a hollow, cylindrical-shaped driving member rotatably mounted in said housing and provided on its interior with a longitudinally-disposed recess of substantially hyperbolic shape in transverse cross section, a driven member rotatably mounted in said driving member provided with a plurality of radially-disposed, spring-pressed blades whose outer edges bear against the interior of said driving member, a transverse partition in said housing that forms a chamber at one end of same that is adapted to contain a hydraulic medium, ports in said partition that establish communication between said chamber and the recess in said driving member, and an oscillating valve arranged in sliding engagement with said partition for controlling the ports therein.

ARTHUR E. HOLBROOK.